H. P. CLAUSEN.
TESTING ARRANGEMENT.
APPLICATION FILED JULY 24, 1916.
1,251,750.
Patented Jan. 1, 1918.
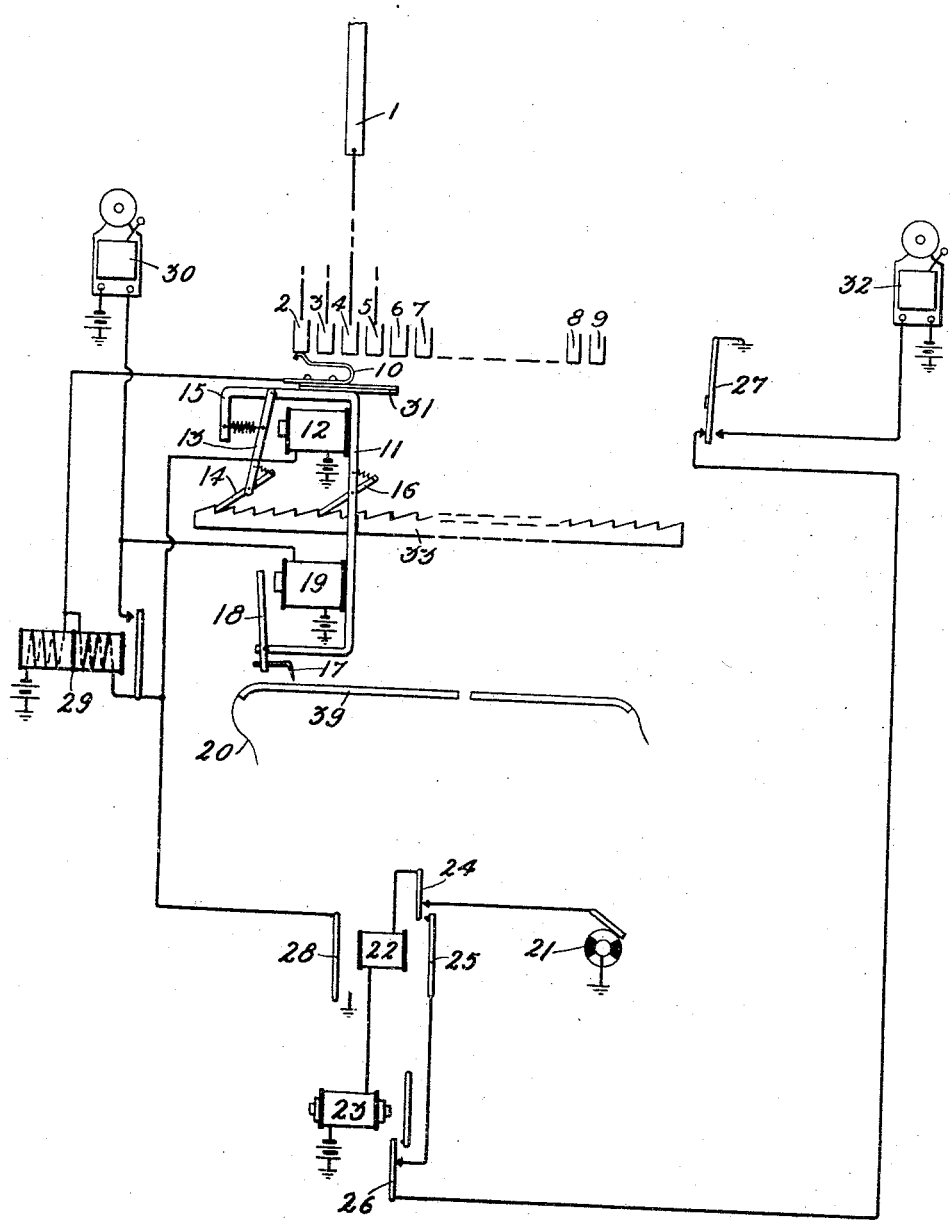
Inventor:
Henry P. Clausen
by N. C. Hannel, Att'y.

UNITED STATES PATENT OFFICE.

HENRY P. CLAUSEN, OF MOUNT VERNON, NEW YORK, ASSIGNOR TO WESTERN ELECTRIC COMPANY, INCORPORATED, OF NEW YORK, N. Y., A CORPORATION OF NEW YORK.

TESTING ARRANGEMENT.

1,251,750.   Specification of Letters Patent.   Patented Jan. 1, 1918.

Application filed July 24, 1916. Serial No. 110,969.

*To all whom it may concern:*

Be it known that I, HENRY P. CLAUSEN, a citizen of the United States, residing at Mount Vernon, in the county of Westchester and State of New York, have invented certain new and useful Improvements in Testing Arrangements, of which the following is a full, clear, concise, and exact description.

This invention relates to a testing arrangement for the purpose of testing and recording unstandard conditions which may exist in telephone exchange systems.

It has heretofore been the practice in telephone exchange systems for an attendant to perform certain routine tests for the purpose of ascertaining whether or not the system is operating in the normal or standard manner. In making these tests, it has been the practice for the attendant to manually connect certain testing instruments with various circuits and apparatus in the exchange system and to deduce from the operation of such testing instruments whether or not a particular apparatus or circuit was in unstandard condition. This method of testing requires the service of an attendant and is expensive, owing to the fact that it requires the entire time of several attendants to properly test even a moderate size exchange system. It is an object of the present invention to provide means whereby routine tests such as formerly performed by an attendant may be automatically performed and a record made of unstandard conditions, from which record it will be possible for a single attendant to locate the unstandard conditions and remedy them, thus eliminating the attendant whose duty it was to test and locate such abnormal conditions.

Although the present invention is more particularly applicable to exchanges in which automatic systems are employed, it is obvious that it may be employed in purely manual systems, the principle involved being the same, irrespective of the particular type of the system or apparatus which it is desired to test. Therefore, the invention will be described in connection with a routine test which is ordinarily performed in connection with exchange systems in which automatic switches are employed, such, for instance, as testing the frames upon which the automatic switches are mounted.

The invention will best be understood from the detailed description and the accompanying drawing, in which the figure represents diagrammatically an automatic testing arrangement of the invention.

In the drawing, the switch frames to be tested are indicated at 1, which frames are connected to a series of terminals 2, 3, 4, 5, 6, 7, 8, 9, which terminals form the part of an automatic switch, one such switch being provided for each group of switch frames it is desired to test. The automatic switches, in addition to the contacts above described, include a brush 10 which is carried by a movable frame 11, which frame is adapted to be moved step by step in response to the operation of a magnet 12 carried by the frame. Mounted on an armature 13 of the magnet 12 which is adapted to be retracted by the spring 15 is a stepping pawl 14. The pawl 14 is adapted to coöperate with a fixed rack 16, the arrangement being such that when the magnet 12 is energized, the pawl 14 is advanced over a tooth and when such magnet is deënergized, the retraction of the armature 13 by the spring 15 moves the switch frame 11 and the brush 10 carried thereby on to the next contact. A holding pawl 33 is also mounted upon the frame 11. A recording device is also included in the switch, which recording device comprises a punch or stylus 17 carried by an armature 18 of the recorder magnet 19, all of which parts are mounted on the switch frame 11. A table or other support 39 supports a record strip 20 over which the stylus or punch 17 is adapted to move. When the recorder magnet 19 is energized, the punch or stylus 17 is adapted to make a mark upon the record strip 20, the position of such mark indicating the position of the frame 11 and hence the brush 10 carried thereby at the instant the recording magnet is operated. The testing arrangement will be best understood, however, by a description of its operation when testing several switch frames.

Any one of three conditions may exist upon the switch frames and hence upon the contacts 2 to 9 connected therewith. In the first place, conditions may be standard, in which case there will be neither potential nor ground upon the switch frame or contact associated therewith. Secondly, due to faulty insulation, there may be an unstandard condition which is indicated by a potential on the switch frame, and thirdly an unstandard condition, due to faulty insulation, may be indicated by the presence of a ground on the particular switch frame. It will be assumed that the switch has been started in operation by throwing a suitable manual switch (not shown) and that the brush 10 is resting upon the contact 2. It will be assumed, for the purpose of illustration, that the switch frame associated with the contact 2 is in normal or standard condition, that the switch frame associated with contact 3 is in unstandard condition, having a potential thereon, and that the switch frame associated with contact 4 is in unstandard condition due to a ground thereon. As soon as the manual switch is thrown, the interrupter 21 is connected in operative relation with the relays 22 and 23, and as soon as an uninsulated segment of the interrupter makes contact with the interrupter brush, a circuit will be closed from battery through relay 23 which is slow-acting, as indicated, relay 22, contact 24, brush of the interrupter and through the interrupter segment to ground. The relay 22 under these conditions will be immediately energized and will close a locking circuit for itself from battery, through relay 23, relay 22, contact 24, armature 25, contact 26, arm 27 to ground, which locking circuit will be maintained during the period that it takes for the slow-acting relay to operate. The relay 22 will close, at its left-hand contact 28, a circuit which may be traced from battery through left-hand and right-hand windings of the differential relay 29 in series, through the armature 28 and front contact to ground. Relay 29 being differentially wound, a current through both windings in series will not operate it. A branch of the circuit just traced, however, will be closed from battery through the stepping magnet 12, armature 28 and contact thereof to ground, which will cause the energization of the magnet 12 and the advance of the pawl 14 over one tooth of the rack 16. As the test relay 29 is not operated, due to the fact that the switch frame connected with the contact 2 is in standard condition, no record of an unstandard condition will be made, so that when the relay 23 pulls up, the locking circuit previously traced for the relay 22 will be opened, causing such relay to release. The release of the relay 22 opens the circuit for the stepping magnet 12 and the armature 13 thereof, when retracted by the spring 15, advances the switch frame 11 and brush 10 carried thereby in position to make contact with contact 3, which, in the case assumed, is in unstandard condition. As soon as the interrupter 21 has made a half revolution, relay 22 will be again energized and in the case assumed, as there is a source of potential on the contact 3, a circuit is established from such potential through contact 3, brush 10, right-hand winding of the differential relay 29, armature 28, and contact thereof to ground. The circuit just traced through the right-hand winding of the test relay 29 will be sufficient to unbalance such relay, and even though current may also be flowing from battery through the two windings of the test relay 29 in series with the contact 28 to ground, the unbalance will be sufficient to cause the test relay 29 to operate. As soon as the test relay 29 operates, a circuit is closed from battery through the alarm bell 30, armature and front contact of the relay 29, armature 28 to ground. Also, as previously explained, stepping magnet 12 was energized as soon as the relay 22 operated. In addition to the circuit for the alarm bell, a circuit is also closed for the recorder magnet 19 from battery, through the armature and front contact of relay 29, to the armature 28 and its front contact to ground, whereupon the recorder magnet will operate and the punch or stylus 17 will make a mark upon the record strip 20 to indicate that an unstandard condition exists upon the switch frame associated with the contact 3. The alarm bell will also call to the attention of an attendant that an unstandard condition has been found, but there is no necessity for the attendant to attend to such unstandard condition immediately, as he can, at a later time, from inspection of the record strip, determine where such unstandard condition exists.

When slow-acting relay 23 opened the locking circuit previously traced for the relay 22, the release of relay 22 caused the release of relay 29 and magnets 12 and 19, and in response to the release of the magnet 12, the brush 10 is advanced to make contact with the contact 4 upon which, it has been assumed, an unstandard condition exists as indicated by the presence of a ground.

Therefore, as the interrupter 21 makes another half revolution, the previously established circuit for the relays 22 and 23 is established and relay 22 operates. As soon as relay 22 operates, and provided there is a ground connected to brush 10, a circuit is closed from battery through the left-hand winding of the differential test relay, through the brush 10, contact 4, to ground, on the switch frame 1. Although current is flowing from battery through both the left-hand winding and the right-hand winding of the differential relay in series to ground at the armature 28, the ground on the switch frame will cause sufficient unbalance to cause such relay to operate, as it will be apparent that the circuit traced from the differential relay to ground on the switch frame will shunt the circuit leading to the ground at the armature 28. The operation of the relay 29, as in previous instances, establishes a circuit for the alarm bell 30 and for the recorder magnet 19, and the recorder magnet will cause the recording of an unstandard condition. When the slow acting relay 23 pulls up, the energizing circuit for the relay 22 is interrupted and relay 29 and magnets 12 and 19 are released. The release of the magnet 12 causes the switch frame 11 to be advanced to the next position.

It is apparent from the above that the automatic switch will advance the brush 10 from terminal to terminal until the entire series of switch frames has been tested, and when the switch 11 has reached the end of its movement, projection 31, forming a part of such switch, will engage the arm 27 and shift such arm from its front to its back contact. When so shifted, the arm 27 closes a circuit which may be traced from battery through an alarm bell 32, through the contact and arm 27 to ground. The alarm bell will indicate to the attendant that the switch has completed its testing operation and that it should be reset. It is obvious, however, that the arm 27 could be employed for the purpose of closing a circuit which could be arranged to operate a restoring magnet which will automatically restore the switch to its starting position or the switch could be restored by a spring or in any other manner. It should be observed that the testing arrangement shown discloses an automatic arrangement in which means are provided to test for three conditions which may exist upon a piece of apparatus, two of which conditions are unstandard and one of which is standard. The test relay which performs this function, as previously explained, is differentially wound, the mid-point of the windings being connected to the test brush of the switch, the arrangement being such that if there is neither potential or ground on the switch frame connected to the test brush, the windings of the differential relay will be energized in series and will oppose one another; thus the relay will not be energized. As soon, however, as either a potential or a ground is connected to the test brush, irrespective of the amount of such potential, sufficient unbalance will be created between the two windings of the differential relay 29 to cause such relay to operate. It will also be observed that, owing to the fact that the relay 23 is slow operating, sufficient time will be introduced between the movement of the automatic switch from one contact to the next to permit the operation of a test relay and the recorder controlled thereby.

What is claimed is:

1. A testing arrangement for testing telephone apparatus for unstandard conditions comprising a series of contacts connected to the apparatus to be tested, a testing relay provided with differentially arranged windings, an electrical circuit and source of potential for maintaining the windings of such testing relay in balanced condition, and automatic means for associating the junction point of the windings of such differential relay with said contacts.

2. A device for testing telephone apparatus for unstandard conditions, comprising a series of contacts connected to the apparatus to be tested, a testing relay provided with differentially arranged windings responsive to the existence of an electrical potential on said contacts, an electrical circuit and source of potential for maintaining the windings of said testing relay in a balanced condition, and means for successively and automatically associating said relay with said contacts.

3. A device for locating unstandard conditions on insulated frames upon which telephone apparatus is mounted, comprising contacts electrically connected to said frames, a differentially wound relay responsive to either positive or negative potential on said contacts, means for automatically and successively associating said test relay with said contacts, and means controlled by said test relay for recording and identifying the frame or frames upon which the unstandard condition exists.

4. A device for testing telephone apparatus for unstandard electrical conditions, comprising a series of contacts associated with the apparatus to be tested, a differentially wound testing relay responsive to either of two unstandard conditions existing upon such contacts, means for associating said testing relay with said contacts, and means responsive to the detection of an unstandard condition for identifying the piece of apparatus in which an unstandard condition exists and for summoning an attendant.

In witness whereof, I hereunto subscribe my name this 22 day of July, A. D. 1916.

HENRY P. CLAUSEN.

Copies of this patent may be obtained for five cents each, by addressing the "Commissioner of Patents, Washington, D. C."